United States Patent
Kertesz

(10) Patent No.: US 7,631,903 B2
(45) Date of Patent: Dec. 15, 2009

(54) PART FOR CONNECTING A FLUID LINE TO AN OPENING OF A CONTAINER COMPRISING PLASTIC MATERIAL OR FOR CLOSING THE OPENING

(75) Inventor: Janos Kertesz, Hofheim (DE)

(73) Assignee: NORMA Germany GmbH, Maintal (DE)

( * ) Notice: Subject to any disclaimer, the term of this patent is extended or adjusted under 35 U.S.C. 154(b) by 414 days.

(21) Appl. No.: 11/418,432

(22) Filed: May 4, 2006

(65) Prior Publication Data

US 2006/0197341 A1 Sep. 7, 2006

Related U.S. Application Data

(62) Division of application No. 10/651,817, filed on Aug. 28, 2003, now Pat. No. 7,066,498.

(30) Foreign Application Priority Data

Sep. 2, 2002 (DE) .............................. 102 41 286
May 28, 2003 (EP) ................................ 03011989

(51) Int. Cl.
   *F16L 13/00* (2006.01)
   *F16L 47/00* (2006.01)
(52) U.S. Cl. ................ 285/288.1; 285/21.1; 285/141.1; 285/189; 285/285.1; 285/293.1; 285/919; 137/202
(58) Field of Classification Search ................ 285/21.1, 285/288.1, 288.9, 293.1, 285.1, 919, 189, 285/141.1; 137/202, 587
See application file for complete search history.

(56) References Cited

U.S. PATENT DOCUMENTS

| | | | | |
|---|---|---|---|---|
| 653,280 A | * | 7/1900 | Barthels et al. | 285/288.1 |
| 1,978,609 A | * | 10/1934 | Straty | 285/189 |
| 4,613,168 A | * | 9/1986 | Smith et al. | 285/133.11 |
| 5,798,048 A | * | 8/1998 | Ries | 210/767 |
| 5,837,180 A | * | 11/1998 | Linder et al. | 264/230 |
| 5,951,059 A | * | 9/1999 | Kitamura | 285/24 |
| 6,289,915 B1 | * | 9/2001 | Nulman et al. | 137/43 |
| 6,408,867 B2 | * | 6/2002 | Aoki et al. | 137/202 |
| 6,422,261 B1 | * | 7/2002 | DeCapua et al. | 137/202 |

(Continued)

FOREIGN PATENT DOCUMENTS

DE           100 48 973         *  7/2001

(Continued)

*Primary Examiner*—James M Hewitt
(74) *Attorney, Agent, or Firm*—Friedrich Kueffner

(57) ABSTRACT

A part for connecting a fluid line to an opening of a container comprised of thermoplastic material or for closing the opening of the container has a first component and a second component of thermoplastic material. The first component has a surface to be connected to the container by forming a welded heat fusion joint. The first component has an insufficient diffusion barrier capability relative to hydrocarbon fuel. Compared to the material of the first component, the material of the second component has higher diffusion barrier capability, reduced swelling capability relative hydrocarbon fuel, higher mechanical strength, and higher thermal shape stability. The first component encloses the second component at least up to an injection location remote from the connecting surface. The material of the second component is injected into the still formable core of the material of the first component via the injection location.

14 Claims, 5 Drawing Sheets

U.S. PATENT DOCUMENTS

| | | | |
|---|---|---|---|
| 6,517,116 B1 * | 2/2003 | Cassaro et al. | 285/189 |
| 6,540,868 B1 * | 4/2003 | Kertesz | 156/304.2 |
| 6,612,324 B2 * | 9/2003 | Szlaga | 137/2 |
| 6,679,282 B2 * | 1/2004 | Aoki et al. | 137/202 |
| 6,733,048 B2 * | 5/2004 | Kurihara et al. | 285/423 |
| 6,840,264 B1 * | 1/2005 | Bhavsar et al. | 137/202 |
| 6,863,315 B2 * | 3/2005 | Sadr | 285/189 |
| 6,905,147 B2 * | 6/2005 | Kertesz | 285/285.1 |
| 7,066,498 B2 * | 6/2006 | Kertesz | 285/288.1 |
| 2001/0047822 A1 * | 12/2001 | Aoki et al. | 137/202 |
| 2001/0050478 A1 * | 12/2001 | Schmitz | 285/21.1 |
| 2002/0059954 A1 * | 5/2002 | Aoki et al. | 137/202 |
| 2002/0079694 A1 * | 6/2002 | Kurihara et al. | 285/21.1 |
| 2002/0167163 A1 * | 11/2002 | Ilo et al. | 285/21.1 |
| 2003/0106586 A1 * | 6/2003 | Dunkle | 137/202 |
| 2003/0116190 A1 * | 6/2003 | Szlaga | 137/202 |
| 2003/0173776 A1 * | 9/2003 | Morohoshi et al. | 285/189 |
| 2004/0055638 A1 * | 3/2004 | Yamada et al. | 137/202 |
| 2004/0056482 A1 * | 3/2004 | Kurihara et al. | 285/189 |
| 2004/0155457 A1 * | 8/2004 | Mejlhede et al. | 285/21.1 |

FOREIGN PATENT DOCUMENTS

| | | | |
|---|---|---|---|
| DE | 100 62 997 | * | 7/2002 |
| EP | 1063078 | * | 12/2000 |
| EP | 1095962 | * | 5/2001 |
| EP | 1233174 | * | 8/2002 |

* cited by examiner

PART FOR CONNECTING A FLUID LINE TO AN OPENING OF A CONTAINER COMPRISING PLASTIC MATERIAL OR FOR CLOSING THE OPENING

CROSS-REFERENCE TO RELATED APPLICATIONS

This application is a Divisional Application of U.S. application Ser. No. 10/651,817, filed Aug. 28, 2003, now U.S. Pat. No. 7,066,498.

BACKGROUND OF THE INVENTION

1. Field of the Invention

The invention relates to a part for connecting a fluid line to an opening of a container, comprised substantially of thermoplastic material, in particular, polyolefin, or for closing the opening, wherein the part comprises at least one first and second component of primarily thermoplastic material, wherein the material of the first component forms with the material of the container a heat fusion joint by welding but has no sufficient diffusion barrier capability relative to hydrocarbons, such as gasoline or diesel fuel, and wherein the material of the second component has a significantly higher diffusion barrier capability and reduced swelling capability relative to hydrocarbons and a higher mechanical strength, even after hydrocarbon exposure, as well as a higher thermal shape stability than the material of the first component.

2. Description of the Related Art

In a part of this kind known from DE 100 62 997 A1 in the form of a pipe-shaped socket, the first component comprises polyethylene (PE), in particular high-density polyethylene (HDPE), and the second component polyamide (PA). A section of the first component which is remote from the container to which the pipe socket is to be welded is surrounded by injection molding by the material of the second component. An annular part of the first component is welded to the container. The container is also comprised substantially of HDPE. Therefore, when welded, it forms a heat fusion connection with the first component. The polyamide of the second component has a high diffusion barrier capability and reduced swelling capability with regard to fuels, such as gasoline or diesel fuel, and, moreover, a high mechanical strength. In the section of the first component that is embedded by injection molding by the second component, the pipe socket is thus substantially impermeable relative to diffusion of fuels. Even though the materials of the two components in their overlap area form an intimate heat fusion connection by bridge formation, there may still be the situation that in the overlap area between the two components leakage occurs in that fuel escapes along the connecting surface of the components because the connecting surface is exposed directly to fuel across its inner edge and because it has the tendency to tear as a result of the higher swelling capability of the material of the first component in comparison to that of the second component. Moreover, the fuel can diffuse through the annular part.

SUMMARY OF THE INVENTION

It is an object of the present invention to provide a part of the aforementioned kind with which escape of fuel is prevented to a greater degree in comparison to the prior art.

In accordance with the present invention, this is achieved according to a first solution in that the material of the first component encloses the second component at least up to an injection location, which is positioned remote from a surface of the part to be welded to the container at a distance that is as great as possible or the greatest possible distance, wherein the material of the second component has been injected into the still formable core of the material of the first component via the injection location.

A second solution to the object resides in that the material of the second component encloses the first component at least up to the injection location, which is positioned remote from a surface of the part to be welded to the container at a distance that is as great as possible or the greatest possible distance, wherein the material of the first component has been injected via the injection location through the still formable core of the material of the second component to the surface that is to be welded to the container.

With both solutions it is possible that no edge, or only one edge, of the connecting surface of both components is directly exposed to the fuel. Leakage along the connecting surfaces is therefore substantially or completely prevented. When the distance between the surface to be welded to the container and the injection location corresponds to the maximally possible distance, leakage is prevented because of the correspondingly long travel distance that the hydrocarbon fuel would have to travel via the connecting surface. This travel distance is moreover extended by a wave shape of the connecting surface essentially forming a labyrinth seal; the wave shape is caused on the contact surfaces of the still formable materials of both components by the injection process. The wave shape results also in a positive-locking connection. Moreover, the barrier capability in the overlap area of the two components with respect to diffusion of fuels is still high because the diffusion is prevented by the substantially diffusion-tight second component. Moreover, the mechanical strength and thermal shape stability in the overlap area is very high. Moreover, the injection of the material of one component into the formable core of the other component allows manufacture of the part in one and the same shaping tool.

Preferably, it is ensured that the part is substantially tubular and, in the case of the first solution, the material of the second component and, in the case of the second solution, the material of the first component fills most of the length of the tubular wall. Accordingly, the part is just as diffusion-tight and stable over almost its entire length as the material of the second component.

This is particularly the case when, according to the first solution, the material of the second component and, according to the second solution, the material of the first component forms an end section of the tubular part, which end section is facing away from the surface to be welded to the container.

On the other hand, for a substantially tubular component the material of the second component, in the case of the first solution, and the material of the first component, in the case of the second solution, can extend from an annular member of the first component provided with the surface to be connected to the container to the end of the tubular part facing away from this surface.

According to the first as well as the second solution, the annual member delimits between it and a coaxial tubular projection of the part a coaxial annular groove; the axial thickness of the annular member and the depth of the annular groove can be selected such that the axial thickness, after welding the surface to the container, is significantly reduced in comparison to the state before welding because of a partial lateral flow of melted material of the annular member, but the bottom of the annular groove maintains a spacing from the container. When welding the annular member to the container, the thickness of the annular member is reduced because of the laterally flowing melted material of the annular member so that, after welding, the annular surface available for diffusion of the fuel in the annular groove is very small; however, the material of the second component remains enclosed therein.

In the first as well as in the second solution, the material of the first component can be polyolefin, in particular, a functionalized polyethylene PE, which can be heat-fused to the material of the container.

On the other hand, in both solutions the second component comprises at least one of the materials EVOH, PA, POM, PEN, PBT, PET, PBN, LCP, PPS, PPA, PP, aliphatic polyketone, and fluoro-thermoplastic material. The materials EVOH, PA, and PP form a heat-fused connection at least with the functionalized polyethylene PE of the one component during injection molding of the material of the other component into that of the first component, which connection is not only material-bonding but also positive-locking. For these and the other materials the same holds true for practically all polyolefins and/or copolymers after a corresponding modification.

Moreover, it can be ensured that, in the case of the first solution, the second component and, in the case of the second solution, the first component encloses a third component with which the at least one of the properties of the component, i.e., strength, diffusion barrier capability, and thermal shape stability, is increased. This third component can also be arranged in the second component or first component in that its material is injected into the still formable core of the second component or first component. This can also be carried out in the same shaping tool (mold) in which the first and second components are shaped.

The third component can be comprised primarily of one of the materials EVOH, PA, POM, PEN, PBT, PET, PBN, LCP, PPS, PPA, aliphatic polyketone and fluoro-thermoplastic material so that the properties of the component, i.e., strength, diffusion barrier capability, and thermal shape stability, are improved.

At least the first component, as is known in the art (DE 38 28 696 A1), can comprise an electrically conducting additive so that the part will not be electrostatically charged by means of fuel moving across the surface of the part, in particular, when passing fuel through a tubular part, and ignition of the fuel in the part by spark discharge is prevented.

The part can be substantially U-shaped or trapezoidally shaped in cross-section so that it can be used as a closure (lid or plug) for the container opening.

On such a shaped part, at least one further functional part can be added by injection molding, for example, a securing clip which, for example, may serve for securing a fluid line or an electrical cable.

DESCRIPTION OF THE PREFERRED EMBODIMENTS

Figure 1:
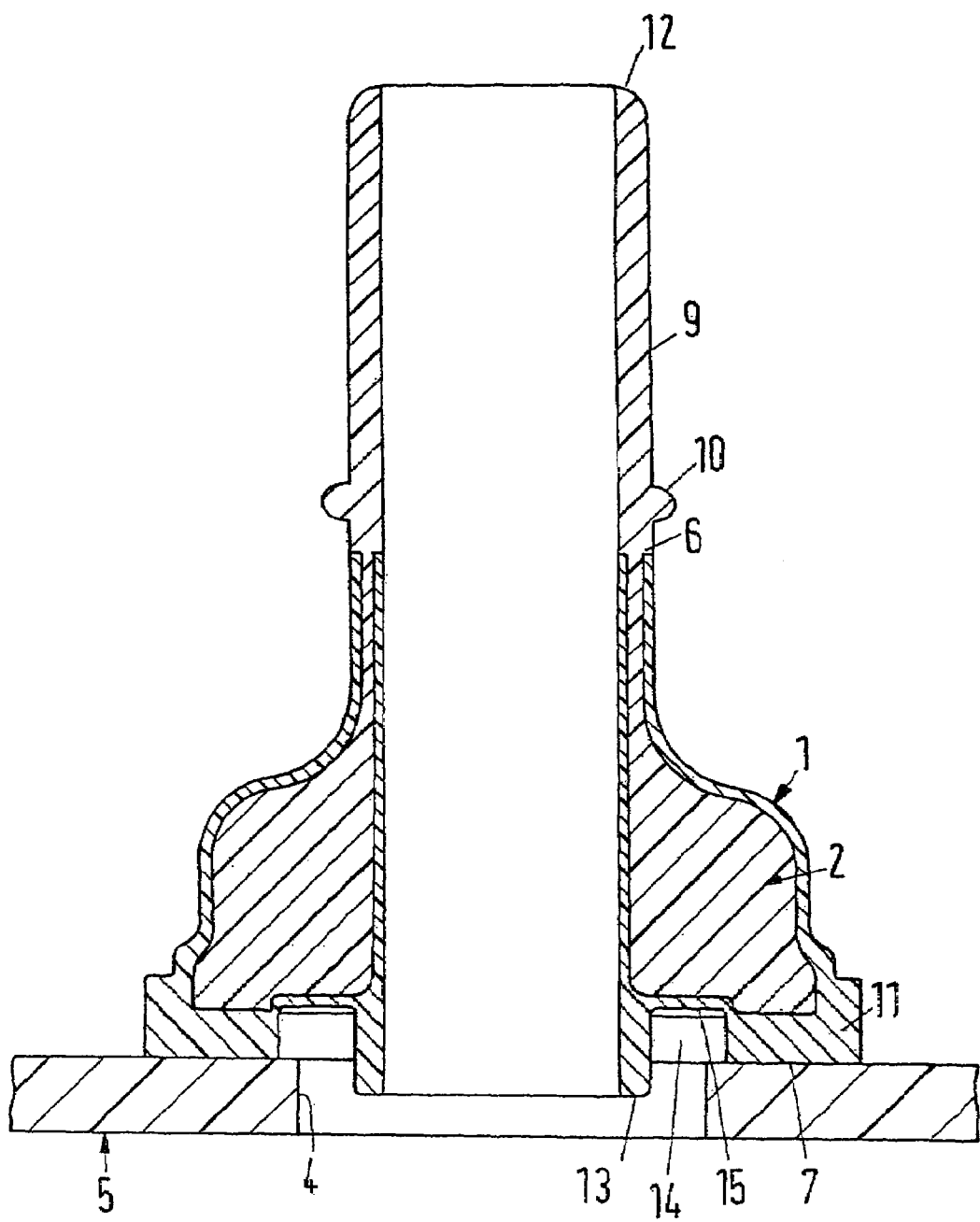
FIG. 1 shows an axial section of a tubular part according to the invention in a position in which it is welded to an opening of a container in order to connect a fluid line (not illustrated) to the container opening.

The part illustrated in FIG. 1 is a tubular socket comprised of two components 1 and 2. It is to be connected by welding to the rim of an opening 4 of a container 5 of which only a portion of its wall is illustrated. The container 5 serves for receiving fuel, in particular, gasoline or diesel fuel, of a motor vehicle and the pipe socket is provided for connecting the fluid line (not illustrated) to the opening 4 of the container 5; the container 5 is filled with fuel via the opening 4.

The container 5 is generally of a multi-layer construction, wherein its outer layer is comprised of HDPE and a central layer is comprised of a material that does not allow diffusion of fuel.

The materials of the first component 1 and of the second component 2 are comprised of primarily thermoplastic material. The material of the first component 1 is selected such that it will form a heat fusion joint or connection with the material of the container 5 by friction welding or heat reflector welding. In some cases, it does not have a sufficient diffusion barrier capability relative to hydrocarbon materials, such as gasoline or diesel fuel. Moreover, it has a relatively minimal mechanical strength so that it is provided, if needed, with a reinforcement. Moreover, it has a relatively high swelling capability with respect to hydrocarbon materials such as gasoline or diesel fuel. Accordingly, the first component 1 comprises a polyolefin, in particular, a functionalized polyethylene (PE), which can be heat-fused to the material of the container 5.

The material of the second component 2 has a significantly higher diffusion barrier capability and reduced swelling capability relative to hydrocarbon materials of the aforementioned kind and a higher mechanical strength, even after exposure to hydrocarbons, as well as a higher thermal shape stability in comparison to the material of the first component 1.

Preferably, the second component 2 comprises at least one of the materials EVOH (ethylene vinyl alcohol), PA (polyamide), POM (polyoxymethylene), PBT (polybutylene terephthalate), PET (polyethylene terephthalate), PEN (polyethylene naphthalate), PBN (polybutylene naphthalate), LCP (liquid crystal polymer), PPS (polyphenylene sulfide), polyphtalamide (PPA), i.e., partially aromatic polyamide, PP (polypropylene), aliphatic polyketone, and fluoro-thermoplastic material.

The tubular component is produced such that the material of the first component 1 encloses the second component 2 at least up to the injection location 6. This injection location 6 is facing away from a surface 7 of the part, which is to be welded to the container 5, and has a relatively great spacing or distance thereto; in the illustrated embodiment, the distance matches approximately half the length of the pipe socket but is preferably even greater. First, the material of the first component 1 is injected into a cavity of a shaping tool and, before it is completely solidified or hardened, the material of the second component 2 is injected at the injection location 6 into the still formable core of the material of the first component 1. Subsequently, in a further shaping tool an end section 9 facing away from the surface 7 is produced by injection molding via the injection location 6 so as to have a securing rib 10 positioned in the vicinity of the injection location 6. The fluid line is pushed across the securing rib and past the injection location 6 onto the socket and is secured by clamping by means of a hose clamp behind the securing rib 10. After hardening and removal from the mold, the part has the illustrated shape with an annular member 11 of the first component 1 provided with the surface 7 to be connected to the container, wherein the material of the second component 2 extends from the annular member 11 to the end 12 of the part facing away from the surface 7.

The annular member 11 delimits between it and a coaxially positioned tubular projection 13, projecting into the opening 4 and serving for centering the part during welding of the part onto the container 5, a coaxial annular groove 14 wherein the axial thickness of the annular member 11 and the depth of the annular groove 14 are selected such that the thickness after welding of the surface 7 to the container 5 is significantly reduced because the melted material of the annular member 11 partially flows laterally into the annular groove 14 and outwardly, but the bottom 15 in the annular groove 14 still has a spacing from the container 5 which spacing corresponds approximately to the remaining axial thickness of the annular member 11.

The material of the component 1 thus encloses completely the component 2 up to the injection location 6 and forms an end section 9 between the injection location 6 and the end 12; this end section 9 is comprised only of the material of the component 2. The material of the component 1 has a significantly reduced diffusion barrier capability in comparison to the material of the component 2 but diffusion can take place only through the annular member 11 which is significantly flatter after welding of the surface 7 to the container 5. Even when theoretically a leakage path along the boundary or connecting surface between the two components 1 and 2 from the radially inner end of the injection location 6 to the radially outer end of the injection location 6 should be present in the case that the materials of the two components 1, 2 are not continuously intimately heat fused across the entire boundary surface, the leakage path would be very long, in particular, because the boundary surface upon injection of the material of the component 2 into the still formable core of the component 1, as a result of the different densities of the two materials, would become wave-shaped or ruffled as a result of swirl formation so that the leakage path indeed would be significantly longer than the illustrated one and the boundary surface would provide a type of labyrinth seal across which fuel indeed could not escape. Moreover, the fluid line which is clamped onto the pipe socket, for example, a hose of elastic material, tightly seals the injection location 6. Since the material of the component 2 has a high thermal shape stability, a high mechanical strength, and a minimal swelling capability, these properties substantially also hold true for the entire part because the material of the second component fills most of the total volume of the component. In addition to the material-bonding connection between the components 1 and 2, the wave shape of their boundary surface also provides a strong positive-looking connection.

Figure 2:
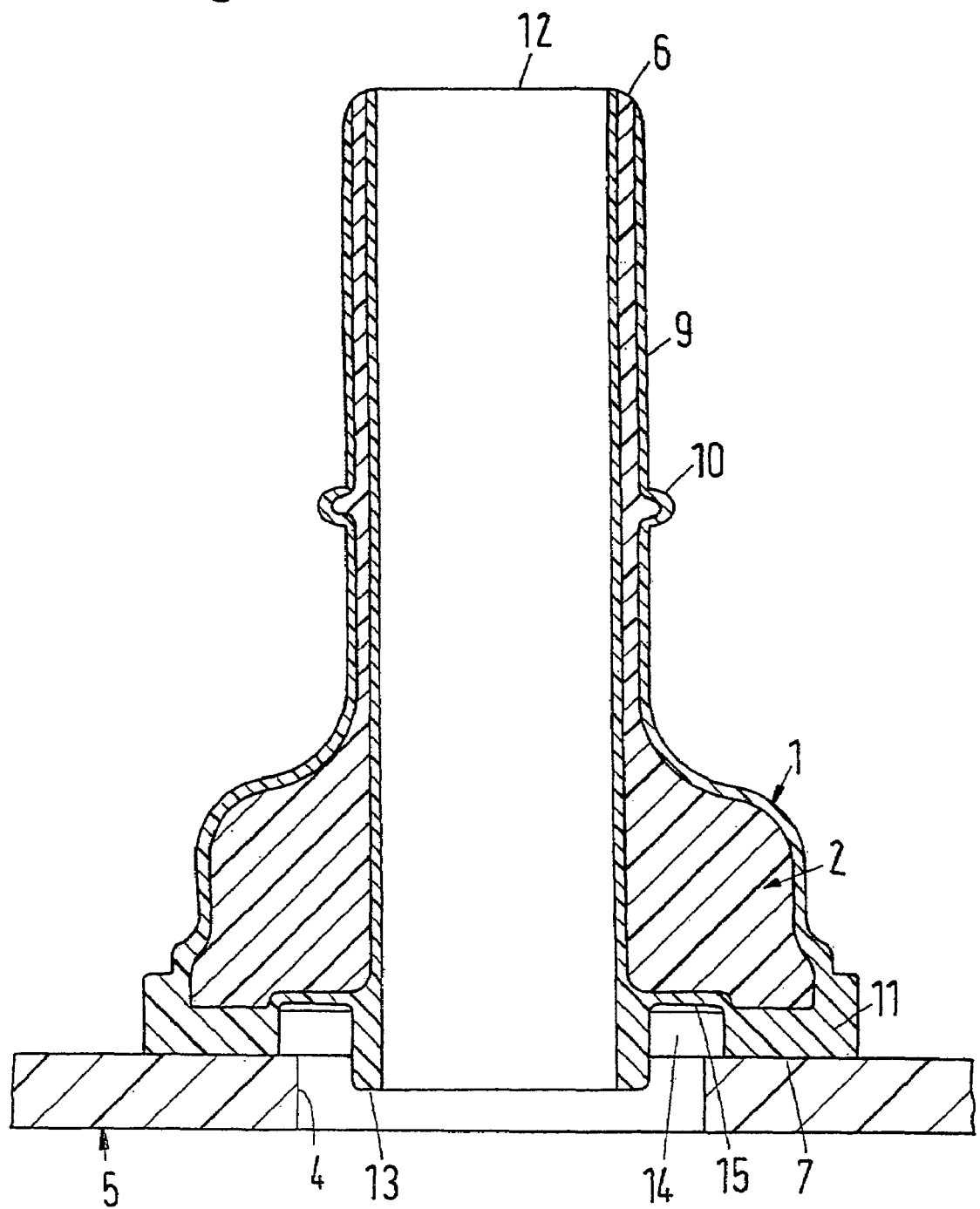
FIG. 2 shows a second embodiment of a part according to the invention in axial section in the same position as the part of FIG. 1.

The embodiment according to FIG. 2 differs from that of FIG. 1 only in that the material of the component 1 extends across the entire length of the tubular part and encloses the material of the component 2 up to the end 12, wherein the injection location 6 coincides with the end 12 facing away from the surface 7 of the annular part 11. In this case, a theoretical leakage path in the axial direction about the entire component 2 would be much longer than in the first embodiment according to FIG. 1, aside form the fact that a fluid line clamped onto the pipe socket would prevent leakage of the fluid.

In other respects, the second embodiment has the same advantages as the first embodiment, aside from the fact that a somewhat reduced wall thickness of the component 2 in the end section 9 is provided; however, the wall thickness could also be selected to be as thick as the wall thickness of the end section 9 in the first embodiment of FIG. 1.

Figure 3:
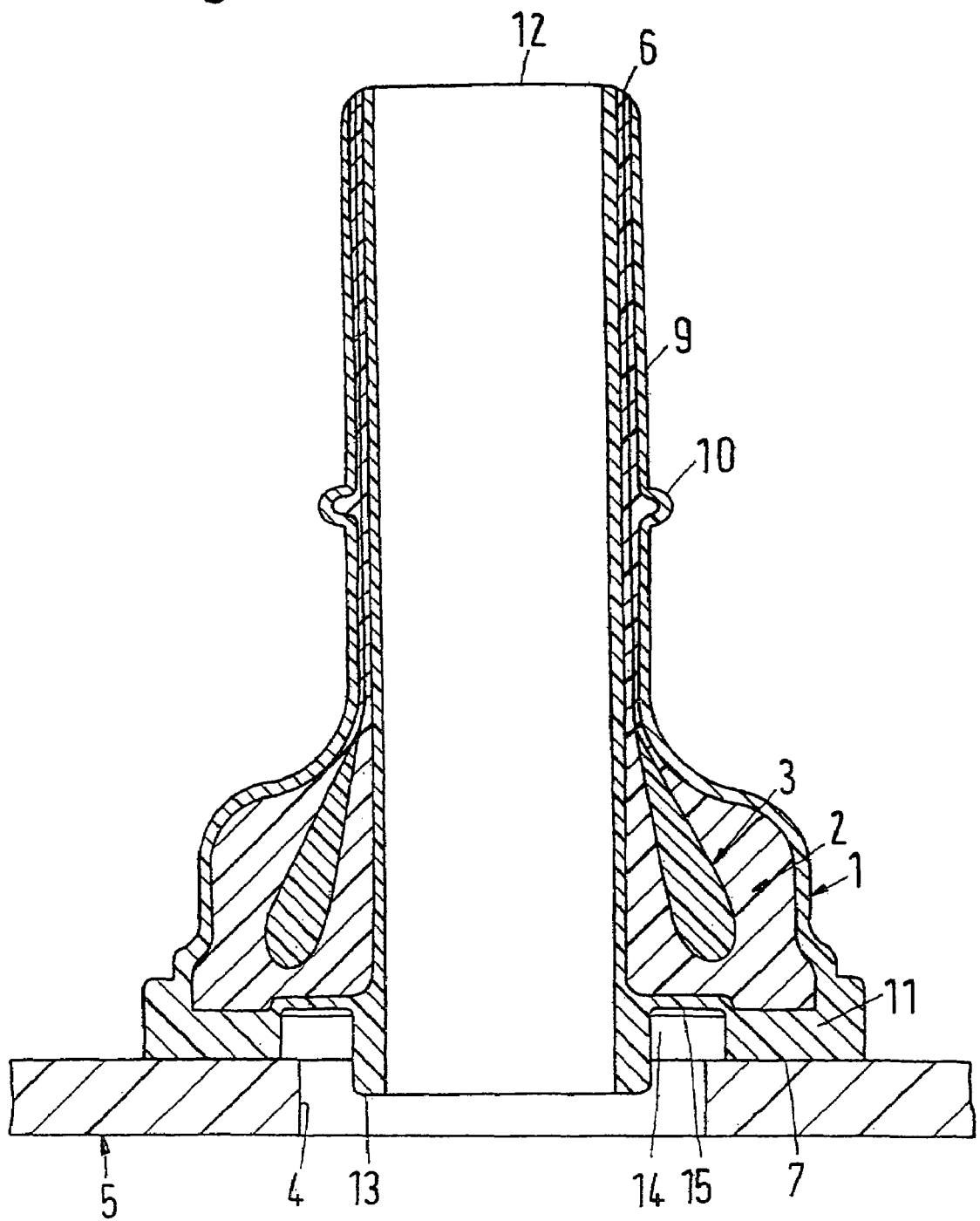
FIG. 3 shows a third embodiment of the part according to the invention in axial section in the same position as the part of FIG. 1.

The third embodiment of FIG. 3 differs from the second embodiment of FIG. 2 only in that a third component 3 has been injected into the still formable core of the material of the component 2, also via the injection location 6 of the second component 2, subsequent to the injection of the material of the second component 2 into the still formable core of the material of the component 1 via the injection location 6 coinciding with the end 12. By doing so, a significant portion of the volume of the component 2 is filled to a location proximal to the annular member 11 or the bottom 15 of the annular groove 14. The material of the component 3 is selected such that it increases at least one of the properties of the part, i.e., strength, diffusion barrier capability, and thermal shape stability. For this purpose, the third component 3 can be comprised primarily of one of the materials EVOH, PA, POM, PEN, PBT, PET, PBN, LCP, PPS, PPA, aliphatic polyketone and fluoro-thermoplastic material.

Figure 4:
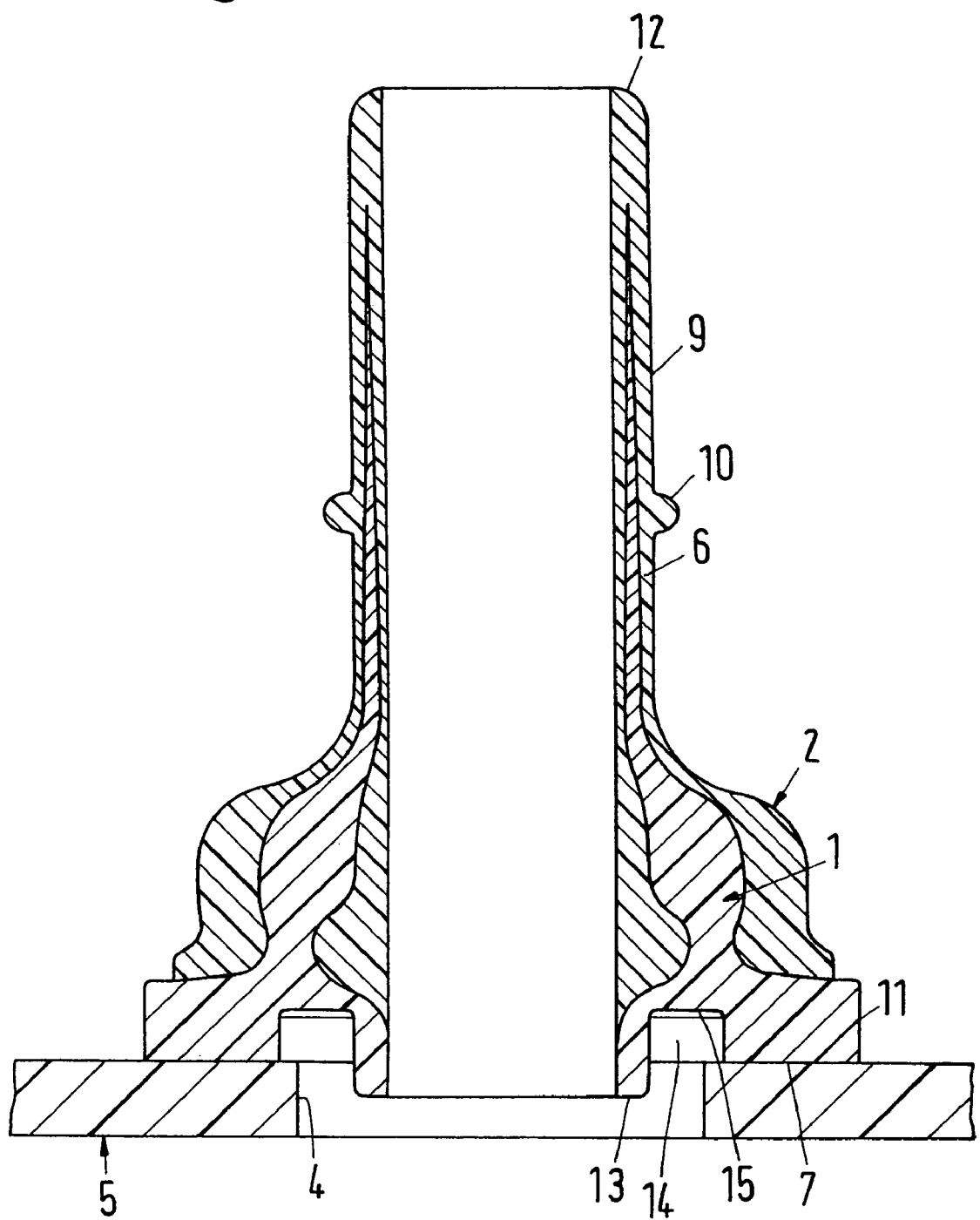
FIG. 4 shows a fourth embodiment of a part according to the invention in axial section in the same position as the part according to FIG. 1.

The embodiment according to FIG. 4 differs from that of FIGS. 1 and 2 substantially in that the material of the component 1, which is the same as in the embodiments of FIGS. 1 and 2, is injected via the injection location 6 through the still formable core of the material of the component 2, which is also the same material as the component 2 of the embodiments according to FIGS. 1 and 2, to the surface 7 and also into most of the section 9. The substantially diffusion-tight and more resilient material of the component 2 extends thus across most of the length of the tubular component as well as across the component 1. The component 1 forms, on the other hand, still the annular member 11 which forms a heat fusion connection with the material of the container 5. This embodiments has thus substantially the same advantages as that of FIG. 2.

Figure 5:
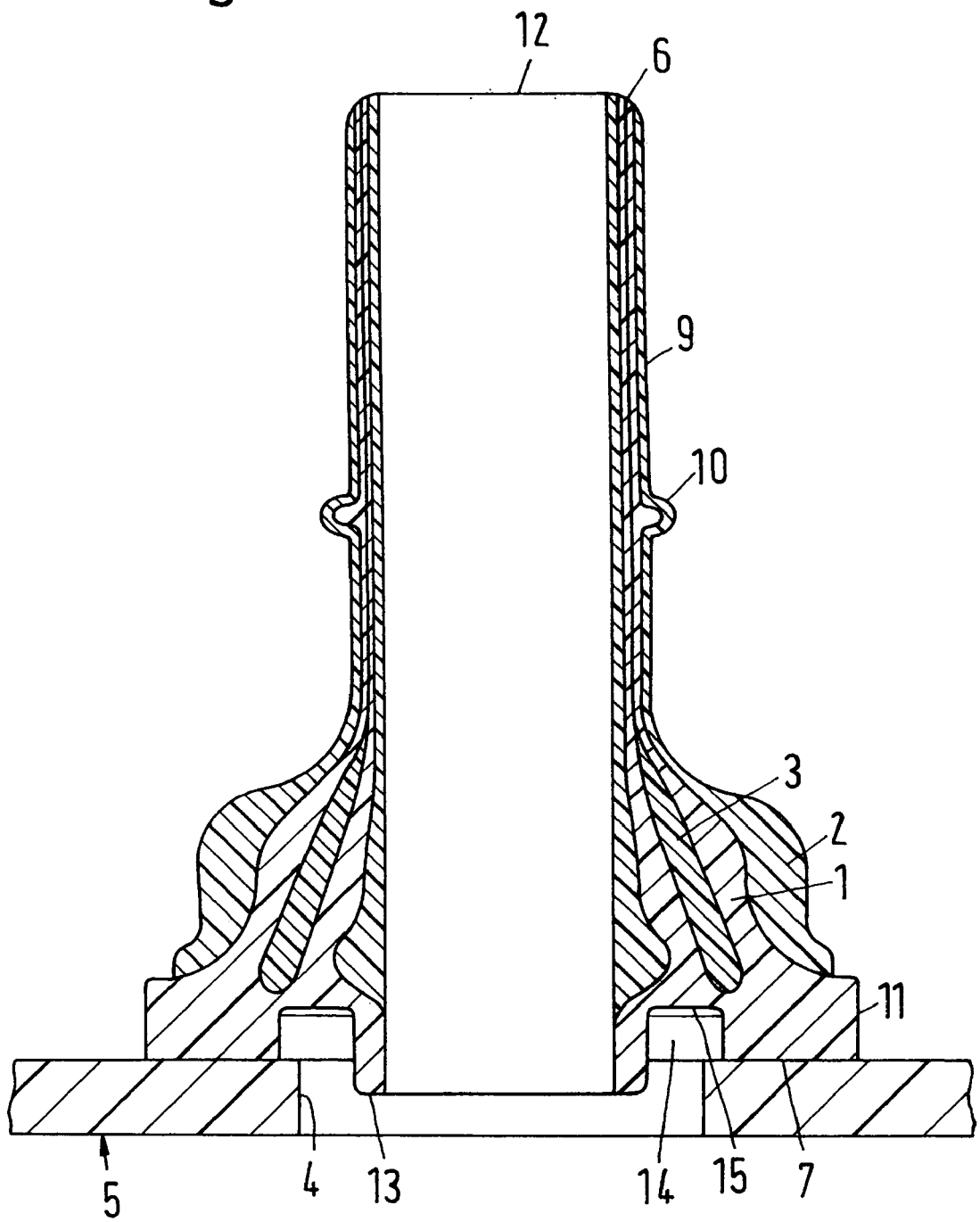
FIG. 5 shows a fifth embodiment of a part according to the invention in axial section in the same position as the part of FIG. 1.

The fifth embodiment according to FIG. 5 differs from the third according to FIG. 3 substantially only in that the third component 3 has been injected into the still formable core of the material of the component 1 instead of into the material of the component 2, as in the third embodiment, from the injection location 6 provided at the end 12 subsequent to the injection of the material of the component 1 to the surface 7 via the injection location 6 at the end 12 through the still formable core of the material of the component 2. In the fifth embodiment, the materials of the components 1 through 3 are also comprised of the same materials as those of the components 1 through 3 of the third embodiment. The fifth embodiment has thus substantially the same advantages as the third embodiment.

Preferably, the first component 1 in all embodiments has an electrically conducting additive. However, the components 2 and 3 can also comprise an electrically conducting additive. In all cases, these additives can be graphite particles, carbon fibers, or iron particles, in particular, fiber-shaped iron particles. The electrically conducting additive prevents an electrical charging by a relative movement between the fuel and the tubular part and thus reduces the risk of a spark discharge and ignition of the fuel.

Electrically conducting fibers effect at the same time a reinforcement of the material of the component, respectively.

Instead of conducting fiber particles, or in addition thereto, reinforcement particles made of plastic material, glass or minerals can be used.

Instead of the illustrated tubular part or socket a part having a substantially U-shaped or trapezoidal cross-section can be provided as a closure (lid or plug) which serves for closing a blind opening or the like in the container. The injection location of the second and, if present, the third component would then be positioned preferably at the center of the outer side of the component. Moreover, on the U-shaped or trapezoidal part functional parts, for example, a securing clip for a fluid line or an electrical cable, can be attached by injection molding.

While specific embodiments of the invention have been shown and described in detail to illustrate the inventive principles, it will be understood that the invention may be embodied otherwise without departing from such principles.

The invention claimed is:

1. A part for connecting a fluid line to an opening of a container comprised of thermoplastic material or for closing the opening of the container, the part comprising:
   a first component and a second component comprised of primarily thermoplastic material;
   wherein the first component has a surface to be connected to the container;
   wherein the material of the first component is configured to form with the thermoplastic material of the container a heat fusion joint via the surface by welding but has no sufficient diffusion barrier capability relative to hydrocarbon fuel;
   wherein the material of the second component, in comparison to the material of the first component, has a significantly higher diffusion barrier capability, a reduced swelling capability relative hydrocarbon fuel, a higher mechanical strength, even after hydrocarbon fuel exposure, and a higher thermal shape stability;
   wherein the material of the second component surrounds the first component at least up to an injection location positioned so as to face away from the surface as far as possible;
   wherein the material of the first component has been injected through the core of the material of the second component via the injection location to form the surface.

2. The part according to claim 1, wherein the part is a tubular part and has a tubular wall, and wherein the material of the first component fills most of a length of the tubular wall.

3. The part according to claim 2, wherein the material of the first component is injected into an end section of the tubular wall remote from the surface.

4. The part according to claim 3, further comprising at least one additional functional part injection-molded onto the part.

5. The part according to claim 1, wherein the part is a tubular part, wherein the first component comprises an annular member having the surface, wherein the material of the first component extends from the annular part of the first component to an end of the tubular part remote from the surface.

6. The part according to claim 5, wherein the tubular part has a coaxially extending tubular projection projecting into the annular member, wherein between the annular member and the coaxial extending tubular projection an annular groove is formed, wherein an axial thickness of the annular member and a depth of the annular groove are selected such that the axial thickness, after welding the surface to the container, is significantly reduced by lateral flow of melted material of the annular member but a bottom of the annular groove has still a spacing from the container.

7. The part according to claim 1, further comprising a third component, wherein the first component encloses the third component, wherein the third component increases at least one of the properties of the part selected from the group consisting of strength, diffusion barrier capability, and thermal shape stability.

8. The part according to claim 7, wherein the third component is primarily comprised of one of the materials selected from the groups consisting of EVOH, PA, PaM, PEN, PET, PET, PEN, LCP, PPS, PPA, aliphatic polyketone and fluoro-thermoplastic material.

9. The part according to claim 1, wherein the first component is comprised of polyolefin is heat-fusible with the thermoplastic material of the container.

10. The part according to claim 9, wherein the polyolefin is a functionalized polyethylene.

11. The part according to claim 1, wherein the second component comprises at least one of the materials selected from the group consisting of EVOH, PA, POM, PEN, PBT, PET, PBN, LCP, PPS, PPA, PP, aliphatic polyketone and fluoro-thermoplastic material.

12. The part according to claim 1, wherein at least the second component comprises an electrically conducting additive.

13. The part according to claim 1, wherein the part in cross-section is substantially U-shaped or trapezoidal and is configured to close the opening of the container.

14. The part according to claim 13, further comprising at least one additional functional part injection-molded onto the part.

* * * * *